Aug. 19, 1947.  F. E. PAYNE  2,426,047
FLUID SEAL UNIT
Filed Sept. 14, 1944
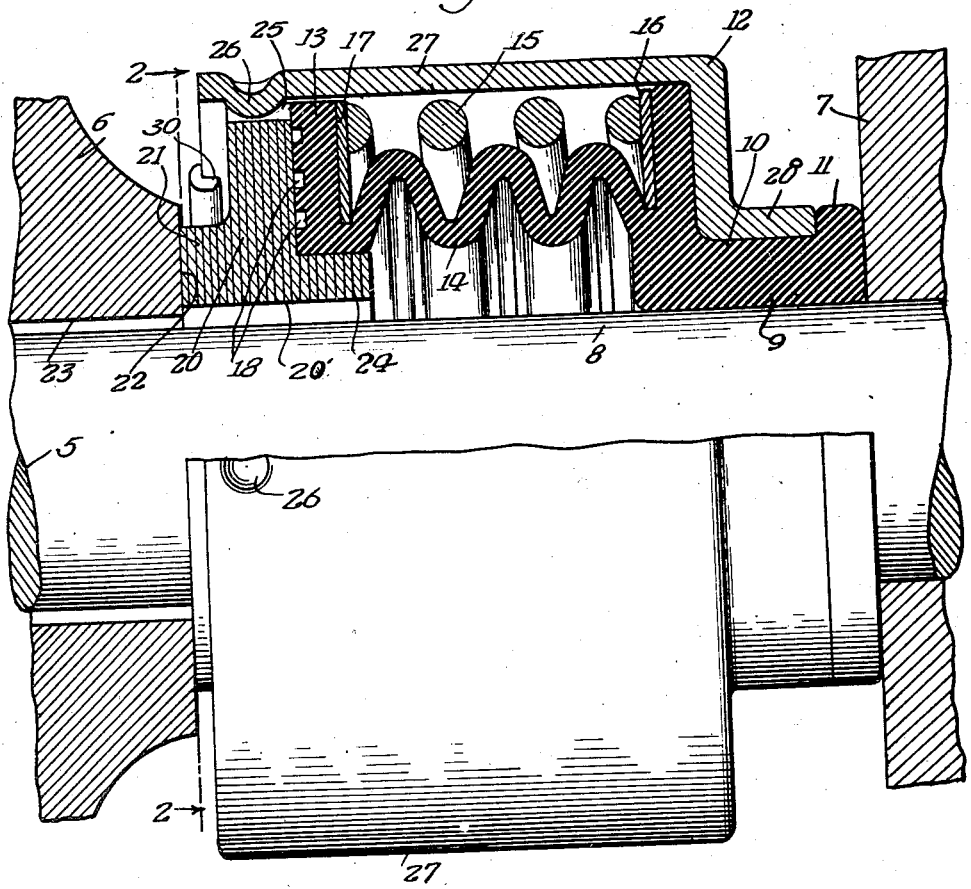
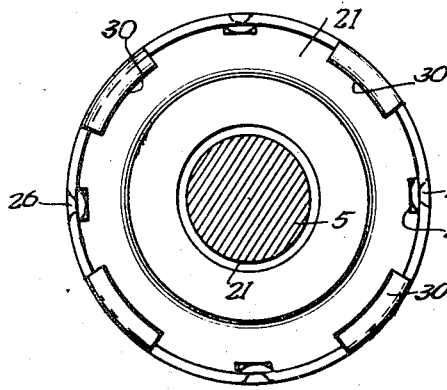
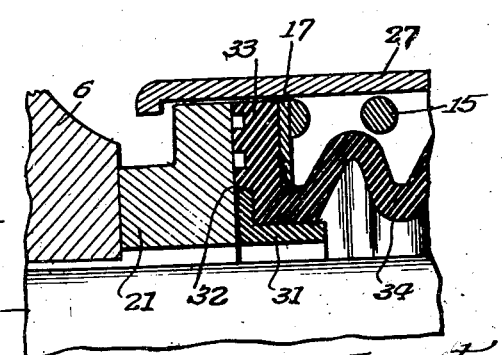
Inventor
Frank E. Payne
By Kent W. Wonnell
Atty.

Patented Aug. 19, 1947

2,426,047

UNITED STATES PATENT OFFICE 2,426,047

FLUID SEAL UNIT

Frank E. Payne, Glencoe, Ill., assignor to Crane Packing Company, Chicago, Ill., a corporation of Illinois Application September 14, 1944, Serial No. 554,039

7 Claims. (Cl. 286—11)

This invention relates in general to a fluid sealing device for rotating shafts of pumps, compressors, and the like, having a portion which fits tightly upon the shaft and another portion which has a slidable sealing surface for engaging a stationary contact surface at right angles to the shaft.

An important object of the invention is to provide a self-contained sealing unit adapted to be applied to any part which it is intended to fit.

A further object of the invention is to combine a flexible bellows seal in a unitary structure adapted to be preloaded on a shaft and having a frictional member to make a fluid-tight sealing joint.

A further object of the invention is to provide a fluid seal of the class described having a resilient driving member engaging a shaft at one end and a contact member at the other end free from engagement with the shaft with a connecting shell enclosing the parts and forming a driver from the contact end to the frictional contact member at the other end without distorting the resilient member.

A still further object of the invention is to provide a sealing unit of the class described having an outer shell which encloses a frictional contact member, a bellows seal and expanding means therefor and also assists in applying the sealing member to a shaft which it is intended to fit.

A further object of the invention is to provide a bellows seal composed of resilient rubber-like material having a portion to fit tightly against the shaft at one end and supported at the other end to insure its freedom from contact with the shaft.

A further object of the invention is to provide a fluid seal having a resilient sealing member and an enclosing unitary shell having resilient means for insuring sealing contact of the outer ends of the sealing member within the shell.

Still a further object of the invention is to provide a unitary sealing device of this kind which is effective and efficient in operation and may be assembled, applied and sold inexpensively as a one piece unitary structure.

Other objects of the invention will appear in the specification and will be apparent from the accompanying drawing in which Fig. 1 is a view partly in section illustrating a unitary seal, in accordance with this invention, as applied to a pump or compressor shaft;

Fig. 2 is an end view of the sealing unit as taken on the line 2—2 of Fig. 1; and Fig. 3 illustrates a modification of the supporting means at one end of the unit.

In fluid sealing units applied to shafts of pumps, compressors, and the like, it is usually desirable to make a tight fitting joint with the shaft at one end and to provide for a frictional or slip connection with a surface at right angles to the shaft at the other end of the seal. The seal is rotated with the shaft and makes a fluid-tight connection with a frictional surface at right angles to the shaft. With these conditions, it is necessary to transmit the driving pressure from one end of the seal to the other. If the seal is composed of resilient flexible material such as rubber or a rubber substitute, the driving of one end by the other tends to distort the intermediate portion of the seal and to cause undue wear and leakage. The present invention overcomes these objections and also provides a unitary seal in which the sealing member is retained in place at both ends by a covering sleeve which prevents transverse distortion of the member between the ends thereof, and also provides suitable support and pressure means for the sealing member to insure a proper sealing engagement at both ends thereof.

Referring now more particularly to the drawing, this seal is shown and described as applied to a rotatable shaft 5 having a stationary bearing or support 6 at one end and usually having an impeller, a collar, or some other member 7 secured to and rotatable with the shaft at a distance from the bearing 6 to provide a space between them into which the seal is inserted.

This seal comprises a flexible resilient member 8 of rubber or rubber-like material which may be cast or molded as desired. At one end of the sealing member is a short sleeve portion 9 adapted to be preloaded upon the shaft 5 or any shaft which it is intended to fit. At the outer side of the sleeve portion is a groove 10 providing an abutment or shoulder 11 at the outer end, and extending outwardly from the opposite end of the sleeve is a sealing flange 12. Another sealing flange 13 is connected to the sleeve portion by an integral resilient bellows 14. The outer extremities of the sealing flanges 12 and 13 project outwardly beyond the outermost folds of the bellows 14 providing a space for the insertion of an expansible coil spring 15 between the outer portions of the inner faces of the flanges without interfering with the flexing movement of the bellows folds.

In order to equalize the pressure of the spring 15 upon the flanges, metal contact rings 16 and 17 are inserted at the ends of the springs in contact with the flanges 12 and 13 and extending inwardly as far as the bellows fold will permit. The spring 15 therefore assists the natural resilience of the bellows 14 in pressing the flanges 12 and 13 oppositely. In the outer face of either or both flanges are circular grooves 18 to assist in making a more fluid-tight joint with any surface which is engaged thereby.

In contact with the outer flange 13 is a frictional disc 20 having an internal diameter 20' larger than the shaft to which it is applied so that it will move freely thereon and having a projection 21 at the outer side with a contact surface 22 engaging the contact surface 23 of the bearing 6 to make a fluid-tight or lapped joint between them. At the inner side and surrounding the center opening is a projection 24 forming a shoulder upon which the outer flange 13 is supported at its inner edge and to hold this end of the sealing member free from any contact or engagement with the shaft.

In the outer edge of the disc are a number of transverse slots 25 for engaging corresponding inner projections or indentations 26 at the edge of a sleeve 27 which extends over the sealing disc and the sealing member and the spring 15 with a reduced shouldered portion 28 adapted to be seated in the groove 10 at the other end of the sealing member. The indentations 26 and slots 25 form a sliding driving connection between the disc 20 and the sleeve 27 which permits the disc to slide axially relative to the sleeve while being driven circumferentially thereby. Thus the sleeve forms a cover and an enclosure for all of the other parts of the seal and the free or open edge has an inwardly turned flange or projection 30 at intervals which are turned inwardly after the parts are assembled therein to hold the parts together in a unitary structure to limit the outward movement of the frictional disc between the shell and thus to limit the expansive movement of the inside sealing unit.

In forming a unit of this kind, the parts are assembled in position and the flange or the projections 30 are turned over inwardly, thus holding the parts together in a single enclosed unit.

When the seal is applied to a shaft, the sleeve portion 9 is pressed forcibly thereon making a preloaded or tight connection which is maintained by the shoulder 28 of the sleeve retaining the unit in position on the shaft whether it engages a member 7 fixed to the shaft or not. The unit is applied so that the frictional disc 20 will be free from engagement with the end projections 30 but will be held by the slots 25 and projections 26 against movement relative to the sleeve 27 and the disc and the flange end 13 of the sealing member will be held in partially compressed and floating condition within the sleeve ready to take up any longitudinal variation or movement of the shaft with respect to the fixed bearing member 6.

Instead of the frictional disc having an integral shoulder 24, this may be omitted as shown in Fig. 3 and a supporting ring 31 angular in cross section, may have one portion thereof seated in a groove 32 at the inside of an end flange 33 (corresponding to the end flange 13) so that its bellows portion 34 will be supported at this outer or free end against contact with the shaft and the flange extremity 33 will be held against the inner face of the friction disc by a spring 15 and a contact disc 17 as shown in Fig. 1.

With these constructions, the seal is applied as a self-contained unit having a frictional disc at one end and a preloaded sealing member at the other end connected by a driving sleeve which insures contact with the sealing member with the shaft at one end and a driving connection with the sealing disc at the other end maintaining the sealing disc and the bellows sealing portion in a loose or floating condition within the connecting sleeve and at the same time preventing any distortion of the bellows member due to the driving action.

I claim:

1. In a fluid seal of the class described, a sealing member of rubber-like material having a portion at one end adapted to fit tightly upon a shaft and a flange portion extending outwardly therefrom, a contact extremity at the other end joined by resilient bellows-like folds and the inner faces of the extremity and the flange being substantially parallel, a frictional member engaged by the said extremity, a coil spring surrounding the bellows folds and bearing against the inner sides of the flange and said extremity, and a driving cover sleeve fitting tightly around the shaft engaging portion at one end and having projections at the other end adapted to engage the frictional member to limit its outward movement under the action of the said spring, and engaging means between the cover sleeve and the frictional member for permitting relative longitudinal movement but preventing relative rotative movement between them.

2. In a fluid seal, a flexible resilient member adapted to fit tightly upon a shaft at one end and having a connected extremity joined thereto by an intermediate yielding bellows fold with a flange at the tight fitting end having its inner face parallel with the remote extremity, a frictional member having a shouldered portion surrounding the shaft and engaged by the said extremity of the sealing member, a coil spring interposed between the extremity and flange of the sealing member surrounding the intermediate bellows fold and tending to press the extremity of the sealing member tightly against the frictional member and upon the shoulder thereof, and a cover shell engaging the portion which fits tightly upon a shaft at one end and also engaged by the extending flange portion of the sealing portion and extending loosely over the other portion of the sealing member, the coil spring and the frictional member, inwardly turned projections at the free end of the sleeve for limiting the outward movement of the frictional member, inward projections adjacent the free end of the sleeve, and transverse slots in the edge of the frictional member for engaging the projections to provide a non-rotative drive connection between the sleeve and the frictional member.

3. In a fluid sealing unit of the class described, a rubber-like sealing member of a size to fit tightly upon a shaft at one end and having a flange extending therefrom at a distance from the end and also having an extremity substantially parallel to the flange joined thereto by a flexible bellows portion, spring means interposed between the flange and the extremity, a frictional disc engaging the outer face of the extremity, means for supporting the inner edge of the said extremity of the sealing member out of contact with the shaft, and a driving cover engaging the tight fitting sleeve portion and the flange at one end and extending loosely over the spring means, the said extremity and the frictional member at the other end.

4. In a fluid sealing device for pump shafts, and the like, a sealing member of resilient rubber-like material comprising a sleeve portion at one end adapted to make a tight fitting engagement with the shaft to which it is applied and having an integral bellows portion and an outwardly extending flange at one end of the sleeve portion, the bellows portion terminating in an integral contact extremity for engaging a surface at right angles to the surface of a shaft to which it is applied, the inner face of the extremity being substantially parallel to the inner face of the said flange, and both the outer edge of the extremity and the outer edge of the flange extending beyond the outer periphery of the bellows portion so that spring means may be interposed between them.

5. A fluid seal of the class described for effecting a seal between two relatively rotatable structures comprising a flexible compressible member having a portion at one end adapted to be preloaded upon one of said structures and having an outer groove and an outwardly extending flange at a distance from the end of this portion, a remote integral extremity connected to said one end by yieldable folds, said extremity and folds being free of said one structure, a coil spring disposed between the said extremity and the flange, contact plates interposed between each end of the spring and the corresponding extremity and flange of the sealing member, a frictional contact member engaged by the said extremity of the sealing member, and a driving cover sleeve having a portion seated in the groove of the sealing member and extending upwardly in contact with the outer face of the flange and then extending closely over the spring and in axial sliding, rotative driving engagement with the outer periphery of the frictional sealing member, the extremity of the sleeve being turned over inwardly to engage and limit the outward movement of the frictional sealing member.

6. A fluid sealing unit for effecting a seal between two relatively rotatable structures, said unit comprising a flexible compressible sealing member having one end in contact with one structure, a sealing flange at the other end, and an intermediate yielding portion connecting the structure-contacting end to the flange, said sealing flange and intermediate portion being freely movable axially of the said one structure, a disc contacting the flange, a unitary sleeve having one end bridging the disc and flange and having a substantially cylindrical portion adjacent the other end compressing the structure-contacting end of the sealing member against the said one structure to effect a rotary-driving fluid-sealing connection therebetween, and a radial portion joining the said cylindrical portion to the remainder of the sleeve; an axially sliding circumferentially driving connection between the sleeve and disc, and resilient means within the sleeve and compressed between the radial portion of the sleeve and the flange on the sealing member for holding the flange against the disc.

7. A fluid sealing unit as described in claim 6, said sleeve comprising a stamping which is supported on said one structure solely by the flexible compressible sealing member.

FRANK E. PAYNE.

REFERENCES CITED

The following references are of record in the file of this patent:

UNITED STATES PATENTS

| Number | Name | Date |
| --- | --- | --- |
| 2,249,930 | Bailey et al. | July 22, 1941 |
| 2,360,372 | Snyder | Oct. 17, 1944 |
| 2,027,505 | Winkler | Jan. 14, 1936 |
| 2,337,639 | Brummer | Dec. 28, 1943 |
| 2,365,351 | Matter | Dec. 19, 1944 |